United States Patent [19]
Hord et al.

[11] Patent Number: 5,797,614
[45] Date of Patent: Aug. 25, 1998

[54] CONVERTIBLE FOLDING GOOSENECK TRAILER HITCH

[76] Inventors: Weldon M. Hord, 10 Country Club Estates, Brenham, Tex. 77833; Richard W. Balcom, 680 Stimpson La., Oroville, Calif. 95965

[21] Appl. No.: 606,545

[22] Filed: Feb. 23, 1996

[51] Int. Cl.$^6$ ............................................. B62D 63/00
[52] U.S. Cl. ................................. 280/417.1; 280/455.1
[58] Field of Search ........................ 280/417.1, 415.1, 280/441.2, 455.1, 457, 491.1, 491.4, 491.5, 418.1

[56] References Cited

U.S. PATENT DOCUMENTS

| | | | |
|---|---|---|---|
| 3,520,556 | 7/1970 | Warner | 280/455.1 |
| 3,698,740 | 10/1972 | Chisholm et al. | 280/491.5 |
| 3,796,443 | 3/1974 | Crutchfield | 280/406 A |
| 3,810,661 | 5/1974 | Lowrance | 280/490.1 |
| 3,815,936 | 6/1974 | Oaks, Jr. | 280/415 A |
| 3,840,252 | 10/1974 | Jocoy | 280/415 A |
| 3,889,978 | 6/1975 | Kann | 280/415 B |
| 4,192,524 | 3/1980 | Twiestmeyer | 280/415 A |
| 4,219,211 | 8/1980 | Sauers | 280/441.2 |
| 4,832,358 | 5/1989 | Bull | 280/418.1 |
| 5,566,964 | 10/1996 | Leonard | 280/417.1 |

FOREIGN PATENT DOCUMENTS 992117  6/1976  Canada ........................ 280/455.1

Primary Examiner—Paul N. Dickson
Attorney, Agent, or Firm—Pravel, Hewitt, Kimball & Krieger

[57] ABSTRACT

A convertible folding gooseneck trailer hitch apparatus for towing a conventional A-frame trailer behind a vehicle, the apparatus including a gooseneck assembly having a forward vertical member and an aft vertical member connected by a horizontal member, the forward vertical member rigidly affixing at one end to the horizontal member and connecting to a fifth-wheel towing base platform at the other end, and the aft vertical member pivotally connecting to the horizontal member. A mounting plate assembly rigidly attached to the aft vertical member, the mounting plate assembly having a conventional hitch ball attached thereon. A plurality of adjustable anti-sway braces, each with a fore and aft end, the aft end connecting to the trailer A-frame and the fore end connecting to the aft vertical member of the gooseneck.

16 Claims, 4 Drawing Sheets

5,797,614

CONVERTIBLE FOLDING GOOSENECK TRAILER HITCH

BACKGROUND OF THE INVENTION

1. Field of the Invention

The present invention relates in general to devices used to tow conventional A-frame trailers behind a motor vehicle and in particular for towing a conventional A-frame trailer with a fifth-wheel type hitch.

2. Description of the Prior Art

For many years, the most common type of trailer hitch arrangement used for towing boats, livestock, campers, and recreational vehicle trailers has been the A frame ball hitch. This type of trailer hitch arrangement uses a steel ball of a standard size mounted on or near the rear bumper of the towing vehicle and a cooperating socket element with a downward facing opening mounted on the forward end of the A-frame trailer.

More recently, however, a trailer hitch of the fifth-wheel type has become popular because it minimizes "fish-tailing," provides better mobility and tracking, and shortens the turning radius of the connected vehicles. In the fifth-wheel hitch arrangement, one end of a gooseneck assembly is rigidly secured to the body or chassis of the trailer and the other end is mounted to the bed of a flatbed or pickup truck. Unfortunately, a standard, conventional A-frame trailer that attaches to a ball mounted on the rear bumper of the towing vehicle is incompatible with a fifth-wheel type towing arrangement and vice versa.

In general, the owner of an A-frame ball hitch trailer cannot achieve the advantages of the gooseneck and fifth-wheel type hitch arrangement short of major reconstruction. Prior efforts at converting a standard conventional A-frame trailer to a fifth-wheel type arrangement have generally entailed custom modifications of the trailer which often rendered it incapable of being towed in a conventional fashion from the rear bumper hitch point of a towing vehicle. Many such prior conversion hitches were also complex, expensive, and unreliable and failed to allow speedy reconversion to rear bumper towing. Moreover, because the gooseneck type conversion hitches are usually bulky, they tend to cause a storage problem when attached to the trailer and not in use.

Thus, it would be desirable to have a gooseneck trailer hitch that converts a conventional A-frame hitch ball trailer to a fifth-wheel type hitch, attaches without permanent alteration of the trailer, and permits the gooseneck to stow when not in use.

SUMMARY OF THE INVENTION

The present invention converts A-frame trailers from rear bumper towing to fifth-wheel and gooseneck-type towing. Significantly, installation of the invention does not require physical alteration of the existing trailer structure. Additionally, once installed, the invention provides a means for stowing the gooseneck when it is not in use. Moreover, removal of the invention from the trailer is quick and convenient as the trailer attachments are readily removed from the A-frame.

The convertible folding gooseneck trailer hitch apparatus includes a mounting plate assembly having a vertically extending conventional hitch ball rigidly attached to a gooseneck assembly. The gooseneck assembly includes a forward vertical member and an aft vertical member each attached to opposite ends of a horizontal member. The horizontal member is pivotally attached to the aft vertical member, permitting the horizontal and forward vertical members to be stowed. A plurality of anti-sway braces attach the aft vertical member of the gooseneck to the trailer A-frame.

The trailer A-frame is mounted on the hitch ball of the mounting plate assembly. The anti-sway braces are attached to the A-frame and to the aft vertical member of the gooseneck assembly. The anti-sway braces form a rigid connection between the trailer A-frame and the gooseneck assembly. As connected, the trailer is only free to rotate about the fifth-wheel hitch of the towing vehicle and not the hitch ball of the mounting plate assembly.

BRIEF DESCRIPTION OF THE DRAWINGS

In order to more fully understand the drawings referred to in the detailed description of the present invention, a brief description of each drawing is presented, in which.

DETAILED DESCRIPTION OF THE INVENTION

Figure 1:
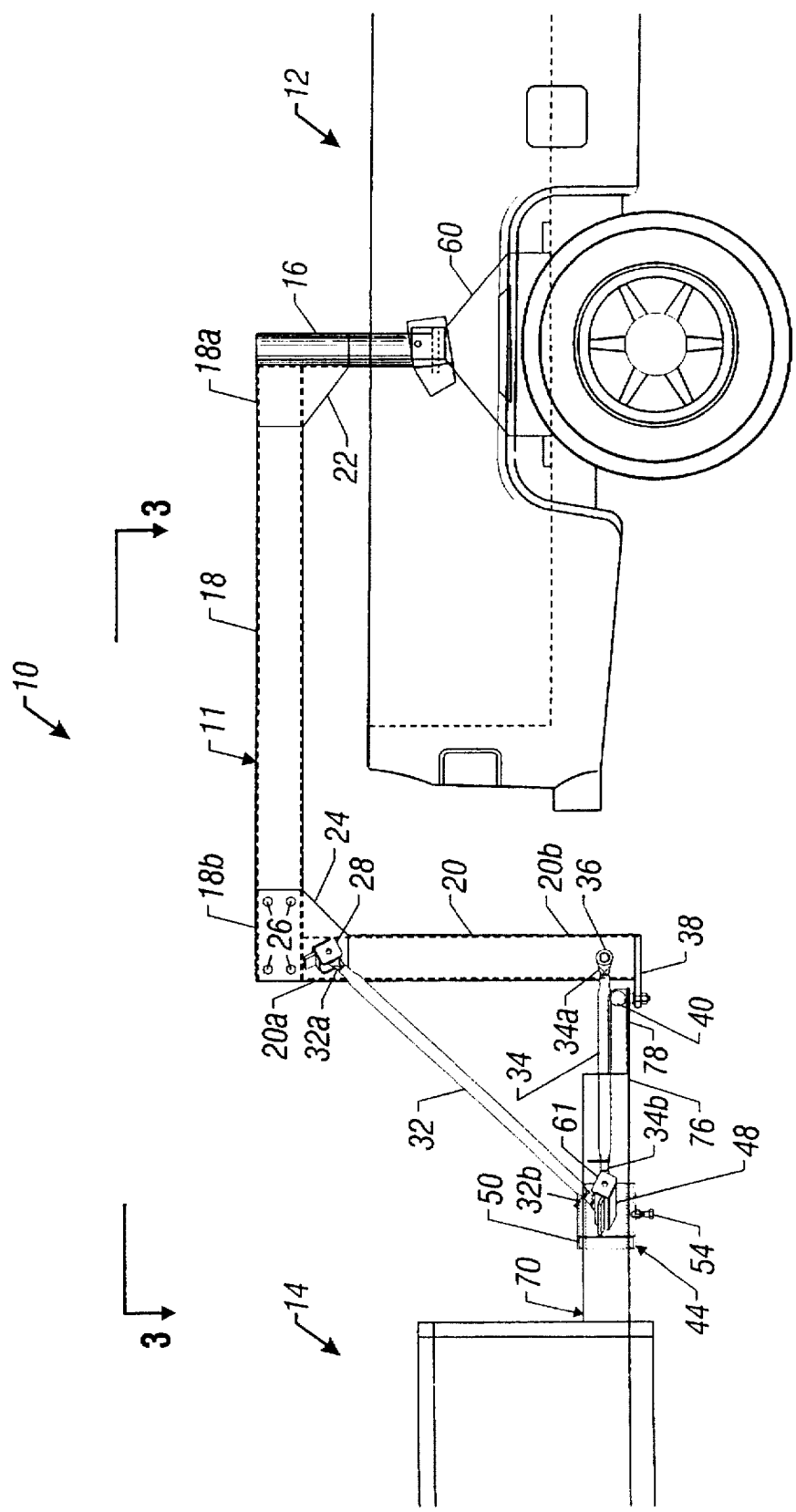
FIG. 1 is a side elevational view of the trailer hitch apparatus of the present invention as generally installed on a towing vehicle and conventional A-frame trailer.

Referring now to the drawings in more detail, FIG. 1 is a side elevational view of a convertible folding gooseneck trailer hitch apparatus 10 as installed in its operative position between a towing vehicle 12 and a conventional A-frame trailer 14. The towing vehicle 12 may be a pickup truck, a flat-bed truck, or other vehicle employing a fifth-wheel type towing base platform 60 as is commonly known in the art.

Figure 2:
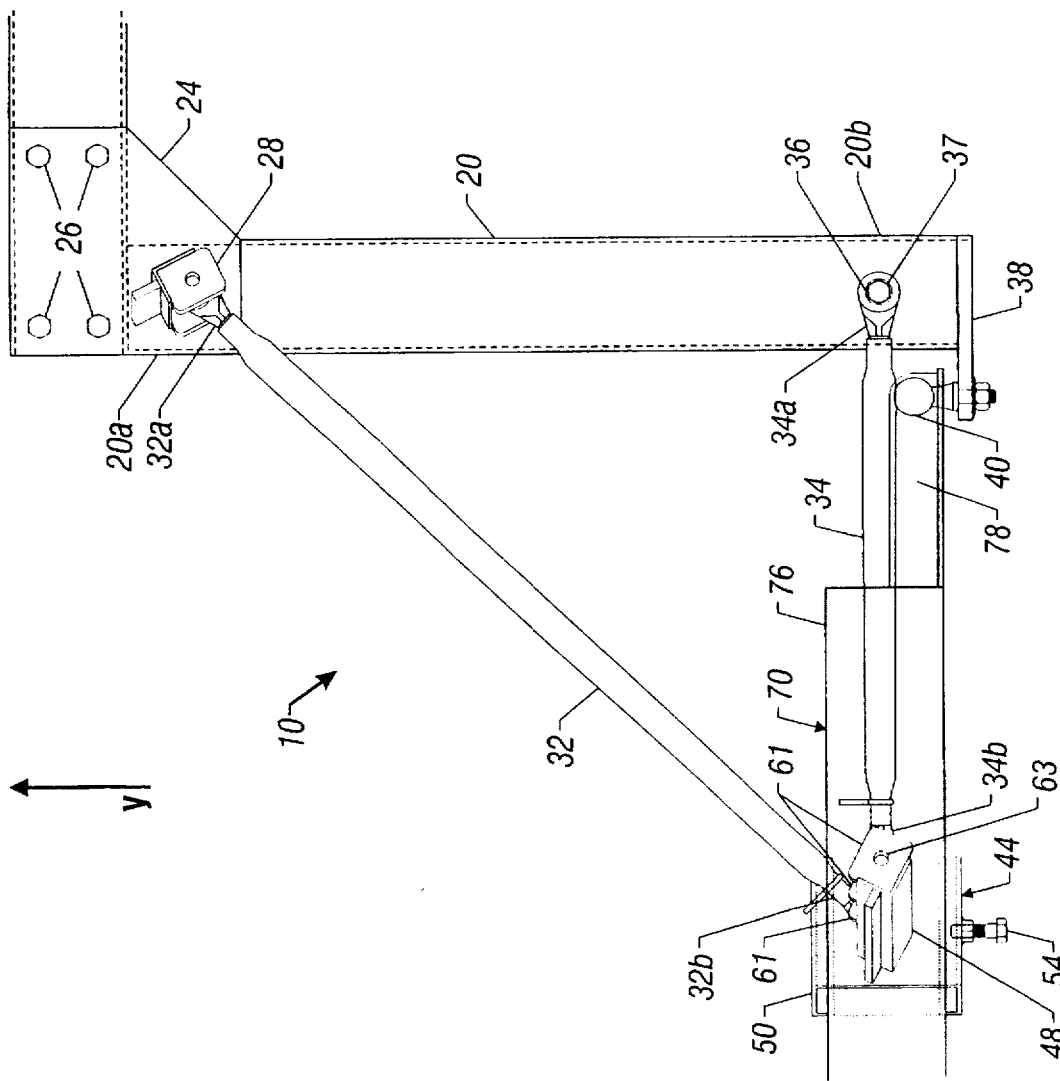
FIG. 2 is an enlarged side elevational view of a portion of the trailer hitch apparatus of FIG. 1.
Figure 3:
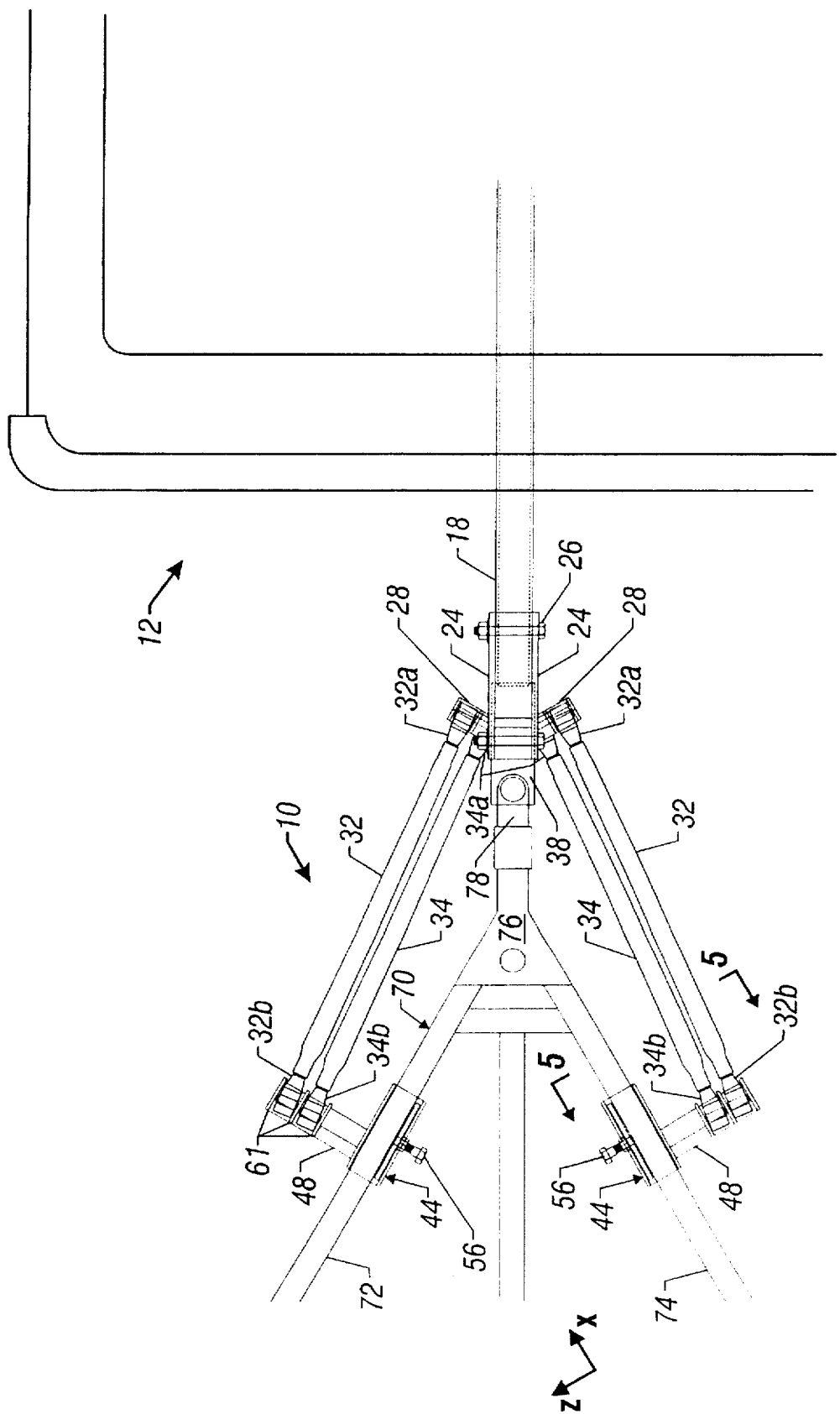
FIG. 3 is a view taken along lines 3—3 of FIG. 1.

Referring to FIGS. 1–3, the conventional A-frame trailer 14 includes an A-frame 70 having a pair of horizontal framing members 72 (FIG. 3) and 74 which join at a central location 76 forward of the trailer 14. A hitch ball socket 78 is mounted to the A-frame 70 and extends forward of the A-frame 70 for connecting to a hitch ball of a typical ball-type trailer hitch.

Referring to FIG. 1, a gooseneck assembly 11 of the trailer hitch apparatus 10 includes a forward vertical member 16, an aft vertical member 20, and a horizontal member 18. Preferably, the forward vertical member 16 attaches to a fore end 18a of the horizontal member 18 by means of a weld and a gusset plate 22. Preferably, the forward vertical member 16 is made of round steel pipe and the horizontal and aft vertical members 18 and 20, respectively, are preferably made of rectangular steel tubing.

Figure 4:
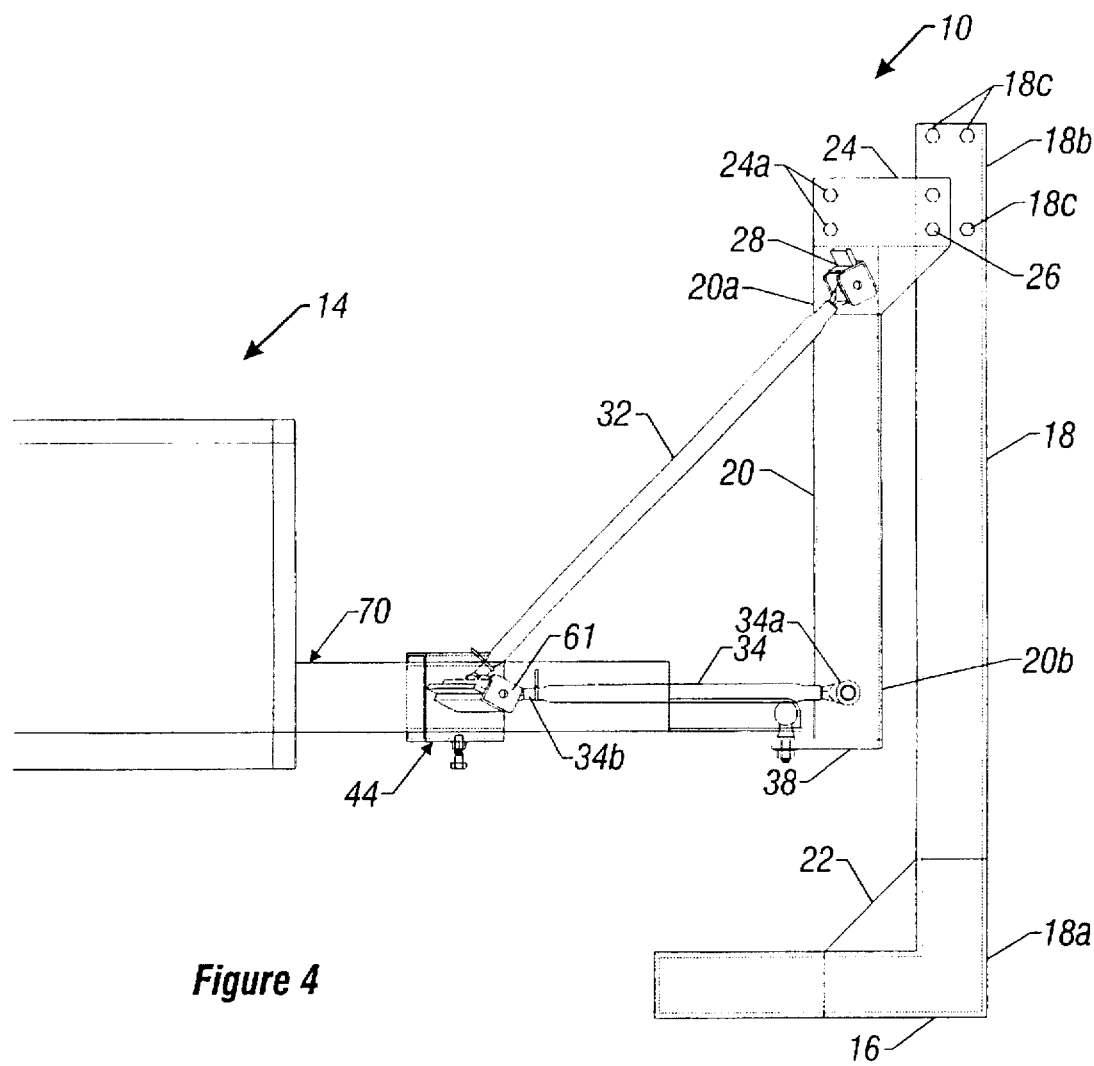
FIG. 4 is a side elevational view of the trailer hitch apparatus as installed on the trailer and in the stowed position.

An aft end 18b of the horizontal member 18 is coupled to the top end 20a of the aft vertical member 20. In the preferred embodiment of the invention, the horizontal member 18 is pivotally connected to aft vertical member 20. Referring to FIGS. 1–4, the coupling means includes a pair of connector plates 24 secured, preferably by welding, to opposing sides of the aft vertical member 20. A plurality of holes 24a (FIG. 4) extend through each connector plate 24. Each hole 24a is aligned with a corresponding hole 241a in the opposing connector plate 24. Referring to FIG. 4, the aft end 18b of the horizontal member 18 includes a plurality of holes 18c therethrough that align with the holes 24a of the pair of connector plates 24. As shown in FIGS. 1–3, bolts and nuts 26 extend through the aligned holes 24a of the connector plates 24 and holes 18c of the horizontal member 18 to couple the horizontal member 18 to the aft vertical member 20. As best shown in FIG. 4, this coupling means permits the horizontal member 18 to pivot downwardly when all but one of the bolts 26 are removed from the connector plates 24. For proper fit, the aft vertical member 20 is preferably made of the same size rectangular steel tubing as the horizontal member 18. It is to be understood that other types of fasteners such as rods or pins could also be used for the bolts and nuts 26.

As best shown in FIGS. 2 and 3, a mounting plate 38 is secured, preferably by welding, to a bottom end 20b of the aft vertical member 20. A conventional hitch ball 40 is secured, preferably by bolting, to the mounting plate 38. In operation, the trailer 14 secures to the trailer hitch apparatus 10 at the hitch ball 40. Thus, the size of the hitch ball 40 bolted to the mounting plate 38 is determined by the ball socket 78 of the trailer 14.

As best shown in FIG. 2, an angle bracket 28 is attached to the top end 20a of the aft vertical member 20. Referring to FIGS. 2 and 3, the angle bracket 28 is attached, preferably by welding, to the connector plates 24 on opposing sides of the aft vertical member 20. In operation, a hole (not shown) in the fore end 32a of an adjustable anti-sway brace 32 permits securing, preferably by bolting, of the fore end 32a to the angle bracket 28. As can be appreciated, other types of fasteners such as rods or pins could also be used for securing the fore end 321a to the angle bracket 28.

Referring to FIG. 2, a fore end 34a of an adjustable anti-sway brace 34 secures to the aft vertical member 20 without an angle bracket 28. In the preferred embodiment of the invention, the fore end 34a of the adjustable anti-sway brace 34 bolts directly to opposing sides of the bottom end 20b of the aft vertical member 20. To secure the adjustable anti-sway brace 34 to the aft vertical member 20, a bolt 37 or other type of fastener, such as a rod or pin, is extended through sway brace hole 36 and into a corresponding hole (not shown) in the bottom end 20a of the aft vertical member 20.

As best shown in FIG. 3, the aft ends 32b and 34b of the adjustable anti-sway braces 32 and 34, respectively, are secured to a bracketed clamp 44 which is attached to the horizontal framing members 74 and 72. Prior to securing the adjustable anti-sway braces 32 and 34, each brace is adjusted to an appropriate length such that each will extend from its bolted location on the aft vertical member 20 to a coordinate point on the horizontal framing members 74 and 72. In the preferred embodiment, the adjustable anti-sway braces 32 and 34 are of identical construction and include a threaded sleeve and two oppositely threaded eyelets that screw into each end of the sleeve. Thus, lengthening and shortening the adjustable anti-sway brace 32, 34 is accomplished by turning the sleeve in the appropriate direction. Alternatively, the adjustable anti-sway braces 32 and 34 may include a threaded sleeve with an eyelet and one threaded eyelet. In the alternative embodiment, the adjustable anti-sway braces 32, 34 are lengthened and shortened by rotating the threaded eyelet until the desired length is accomplished. The unitary adjustment of this anti-sway brace is limited to approximately one-half the thread spacing as the minimum amount of rotation of the threaded eyelet is 180°.

Figure 5:
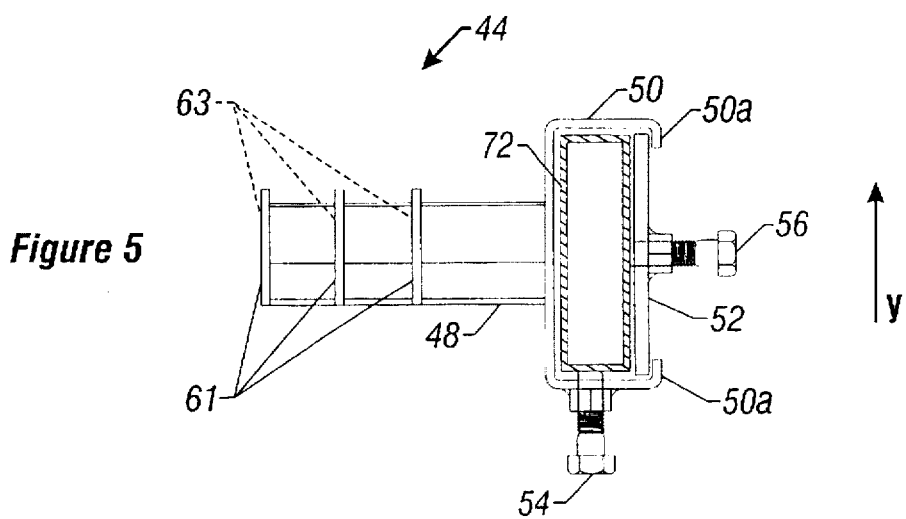
FIG. 5 is a view taken along lines 5—5 of FIG. 3 with the anti-sway braces removed for clarity.

Referring now to FIG. 5, the bracketed clamp 44 includes a C-channel 50 connected to a bracket 48, preferably by welding, and a clamping plate 52. In the preferred embodiment, the C-channel 50 with its flanged ends 50a is sized to fit around the horizontal framing member 72, 74. In operation, the C-channel 50 is placed onto the horizontal framing member 72, 74 and then the clamping plate 52 is slid between the horizontal framing member 72, 74 and the flanged ends 50a of the C-channel 50. Prior to clamping the bracketed clamp 44 into position, its proper location on the horizontal framing member 72, 74 is determined by securing the aft ends 32b and 34b into the bracket 48. Referring to FIGS. 2, 3 and 5, the securing means (not shown) includes a bolt, rod, or pin inserted through center holes 63 of the bracket plates 61 and through center holes of the aft ends 32b and 34b of the adjustable anti-sway braces 32 and 34.

Once the anti-sway braces 32 and 34 are received into the bracket 48, the bracketed clamp 44 is clamped in place on the horizontal framing member 72, 74. Referring to FIGS. 3 and 5, the clamping means includes tightening bolt 56 of the clamping plate 52 and bolt 54 of the C-channel 50. In operation, tightening the tightening bolt 56 against the horizontal framing member 72, 74 effectively presses the clamping plate 52 against the flange ends 50a of the C-channel 50. The contact between the bolt 56 and the horizontal framing member 72, 74 and the resulting contact between the clamping plate 52 and the flange ends 50a eliminates movement of the bracketed clamp 44 in the longitudinal ("X") direction and the lateral ("Z") direction. Similarly, tightening bolt 54 eliminates movement of the bracketed clamp 44 in the vertical ("Y") direction. Additionally, bolt 54 provides resistance to movement in the longitudinal direction.

Referring to FIGS. 1 and 3, as can be appreciated, the adjustable anti-sway braces 32 and 34 make the trailer hitch apparatus 10 and connected trailer 14 a rigid structure. Thus, the adjustable anti-sway braces 32 and 34 assure that the trailer 14 pivots about the fifth-wheel type towing base platform 60 and not about the hitch ball 40, resulting in the benefits of a gooseneck trailer hitch.

The foregoing disclosure and description of the invention is illustrative and explanatory thereof, and various changes in the size, shape, and materials, as well as in the details of illustrative construction and assembly, may be made without departing from the spirit of the invention.

We claim:

1. A convertible folding gooseneck trailer hitch apparatus for towing a trailer behind a vehicle, the trailer including a conventional A-frame having two frame members converging toward a ball socket and the vehicle having a fifth-wheel type towing base platform, the trailer hitch apparatus, comprising:

a gooseneck assembly having an aft vertical member coupled to an aft end of a horizontal member and a forward vertical member fixed to a fore end of said horizontal member;

a mounting plate rigidly attached to said aft vertical member, said mounting plate having a conventional hitch ball attached thereon;

a horizontal pair of anti-sway braces and an inclined pair of anti-sway braces, each of said horizontal and inclined anti-sway braces having a fore end and an aft end;

means for attaching said aft end of said horizontal and inclined anti-sway braces to the trailer A-frame; and a pair of upper brackets for fastening said fore end of said inclined anti-sway braces to said aft vertical member.

2. The apparatus of claim 1, further comprising means for securing said gooseneck assembly to the vehicle towing base platform.

3. The apparatus of claim 1, further comprising means for attaching one of said horizontal anti-sway braces and one of said inclined anti-sway braces to one side of the trailer frame members.

4. The apparatus of claim 3, wherein said attaching means comprises:
- a bracket for receiving said aft end of one of said horizontal anti-sway braces and one of said inclined anti-sway braces;
- a C-channel fixed to said bracket; and
- a means for clamping said C-channel to the trailer frame member.

5. The apparatus of claim 3, wherein said pair of inclined anti-sway braces connects the frame members of the A-frame to said aft vertical member in a relative vertical location distinct from that of said pair of horizontal anti-sway braces.

6. The apparatus of claim 3, wherein said pair of horizontal and said pair of inclined anti-sway braces include means for withstanding compression and tension forces directed between said aft vertical member of said gooseneck assembly and the trailer frame members.

7. The apparatus of claim 1, further comprising means for coupling said aft vertical member with said horizontal member of said gooseneck assembly.

8. The apparatus of claim 7, wherein said means for coupling includes a pair of plates welded to a top of said aft vertical member, each of said plates having a plurality of holes, said horizontal member having holes aligned with said holes in said pair of plates, and bolts inserted through said holes in said pair of plates and said horizontal member holes.

9. The apparatus of claim 1, wherein said aft vertical member and said horizontal member of said gooseneck assembly are made of steel tube having a rectangular cross-section.

10. The apparatus of claim 1, wherein said forward vertical member of said gooseneck is made of steel pipe having a circular cross-section.

11. A convertible folding gooseneck trailer hitch apparatus for towing a trailer behind a vehicle, the trailer including a conventional A-frame having two frame members converging toward a ball socket and the vehicle having a fifth-wheel type towing base platform, the trailer hitch apparatus, comprising:
- a gooseneck assembly having an aft vertical member coupled to an aft end of a horizontal member and a forward vertical member fixed to a fore end of said horizontal member;
- one or more plates with holes therethrough welded to said aft vertical member;
- a plurality of locking pins inserted through said plates into said horizontal member, said horizontal member having holes aligned with said plate holes;
- a mounting plate rigidly attached to said aft vertical member, said mounting plate having a conventional hitch ball member attached thereon;
- a first pair and a second pair of adjustable anti-sway braces, each said anti-sway brace of said first and second pair of anti-sway braces having a fore end and an aft end;
- a pair of brackets for attaching said aft ends of said first and second pairs of anti-sway braces to a trailer A-frame; and
- a pair of upper brackets for fastening said fore end of said first pair of anti-sway braces to said aft vertical member.

12. A convertible folding gooseneck trailer hitch apparatus for towing a trailer behind a vehicle, the trailer including a conventional A-frame having two frame members converging toward a ball socket and the vehicle having a fifth-wheel type towing base platform, the trailer hitch apparatus, comprising:
- a gooseneck assembly having an aft vertical member coupled to an aft end of a forwardly extending horizontal member and a forward vertical member fixed to a fore end of said horizontal member;
- a horizontal pair of anti-sway braces and an inclined pair of anti-sway braces, each of said horizontal and inclined anti-sway braces having a fore end and an aft end, each of said horizontal and inclined anti-sway braces having said fore end connected to said aft vertical member; and
- means for pivotally coupling said aft vertical member with said horizontal member.

13. The apparatus of claim 12, wherein said means for pivotally coupling includes a plate welded to a top of said aft vertical member, said plate having a plurality of holes, said horizontal member having holes aligned with said plate holes, and locking pins inserted through said plate holes and said horizontal member holes.

14. The apparatus of claim 1, wherein said pair of inclined anti-sway braces are adjustable in length.

15. The apparatus of claim 14, wherein said pair of horizontal anti-sway braces are adjustable in length.

16. The apparatus of claim 1, wherein said pair of horizontal anti-sway braces are adjustable in length.

* * * * *